United States Patent [19]

Matsushima et al.

[11] Patent Number: 4,497,563
[45] Date of Patent: Feb. 5, 1985

[54] PROGRAMMED AUTOMATIC EXPOSURE CONTROL

[75] Inventors: Kohji Matsushima; Yasutsugu Nakagawa; Michio Yagi, all of Hachioji, Japan

[73] Assignee: Konishiroku Photo Industry Co., Ltd., Tokyo, Japan

[21] Appl. No.: 435,112

[22] Filed: Oct. 18, 1982

[30] Foreign Application Priority Data

Oct. 26, 1981 [JP] Japan ................. 56-170219

[51] Int. Cl.³ ............................... G03B 7/08
[52] U.S. Cl. ................... 354/429; 354/435; 354/440
[58] Field of Search ............ 354/29, 43, 230, 271, 354/435, 436, 440, 432, 429

[56] References Cited

U.S. PATENT DOCUMENTS

| 3,873,987 | 3/1975 | Brauning et al. | 354/230 |
| 4,032,935 | 6/1977 | Lermann et al. | 354/29 |
| 4,057,812 | 11/1977 | Rentschler et al. | 354/29 |
| 4,122,464 | 10/1978 | Yonemoto et al. | 354/29 |
| 4,350,427 | 9/1982 | Kitai et al. | 354/29 |

Primary Examiner—Russell E. Adams
Attorney, Agent, or Firm—Jordan B. Bierman

[57] ABSTRACT

An automatic exposure control method and device has photometry means for detecting the brightness of a subject and providing an output signal in response thereto, a shutter, driving means for driving the shutter toward a full aperture, closing means for closing the shutter in accordance with the output signal from the photometry means, and adjusting means for adjusting the photometry means in a stepwise manner to provide the output signal variably in accordance with the light detected and the opening position of the shutter. In one embodiment, the driving means for opening the shutter engages a series of contacts for correspondingly short-circuiting photoelectric elements providing the electrical signal output, thereby varying in a stepwise manner the charging of a capacitor in a comparator circuit for disengaging a solenoid controlling the shutter closing means.

3 Claims, 3 Drawing Figures

PROGRAMMED AUTOMATIC EXPOSURE CONTROL

BACKGROUND OF THE INVENTION

1. Field of the Invention

The present invention relates to a method for programmed automatic exposure control and a device thereof and, more particularly, to improvements on the method and device for the exposure control wherein an iris is opened so that an aperture area grows from a small size to a large size and an aperture closing operation is made on the half way of an opening operation due to a signal from a photometry means.

2. Description of the Prior Art

The conventional method for automatic exposure control as stated above has been one wherein an aperture of the shuttercum-iris (hereinafter merely referred to as a shutter) opens continuously and closes when a signal is outputted from a photometry means. Generally, the shutter speed varies by the equivalent of 0.5 EV and the iris varies by the equivalent of 0.5 EV with the $\gamma$ value of CdS photoelectric element in the photometry circuit that is 0.5 when the amount of the light of incidence from the subject varies by 1 EV. Therefore, it has been impossible to photograph laying stress on the iris effect even when the bright subject is photographed. Namely, even when the light amount is LV 13 for ASA 100, the F/T is in the range of 5.6/250–8/125. Since it is impossible to photograph laying stress on the iris effect, it has been the method wherein a high accuracy for the focus adjustment is required.

SUMMARY OF THE INVENTION

The object of the present invention is to make it possible to photograph a bright subject laying stress on the iris effect which has not been made by the conventional programmed automatic exposure control method as stated above. For example, an object is to make it possible to photograph with the iris that is not less than F 11 for ASA 100 and LV 13 or more and also to offer a programmed automatic exposure control method and device wherein the effect of a blurred shot is not emphasized.

The present invention comprises a method for programmed automatic exposure control characterized in that an opening operation for an iris is made stepwise in point of time. The method provides for exposure control wherein an iris is opened so that an aperture area grows from a small size to a large size and an aperture closing operation is commenced during the opening operation in response to a signal from a photometry means. The invention also comprises a programmed automatic exposure control device characterized in that it consists of (a) a photometry means that detects the brightness of a subject and outputs an electric signal, (b) an iris, (c) a driving means to drive the iris toward a full aperture, (d) an adjusting means to cause the photometry means to vary concerning the characteristic between the light amount passing through the aperture of the iris and an output corresponding to the opening position of the iris and (e) a means to close a shutter receiving the electric signal from the photometry means arranged so as to make it possible to attain the object.

DETAILED DESCRIPTION OF THE PREFERRED EMBODIMENT

The present invention will be explained as follows referring to the example illustrated.

Figure 1:
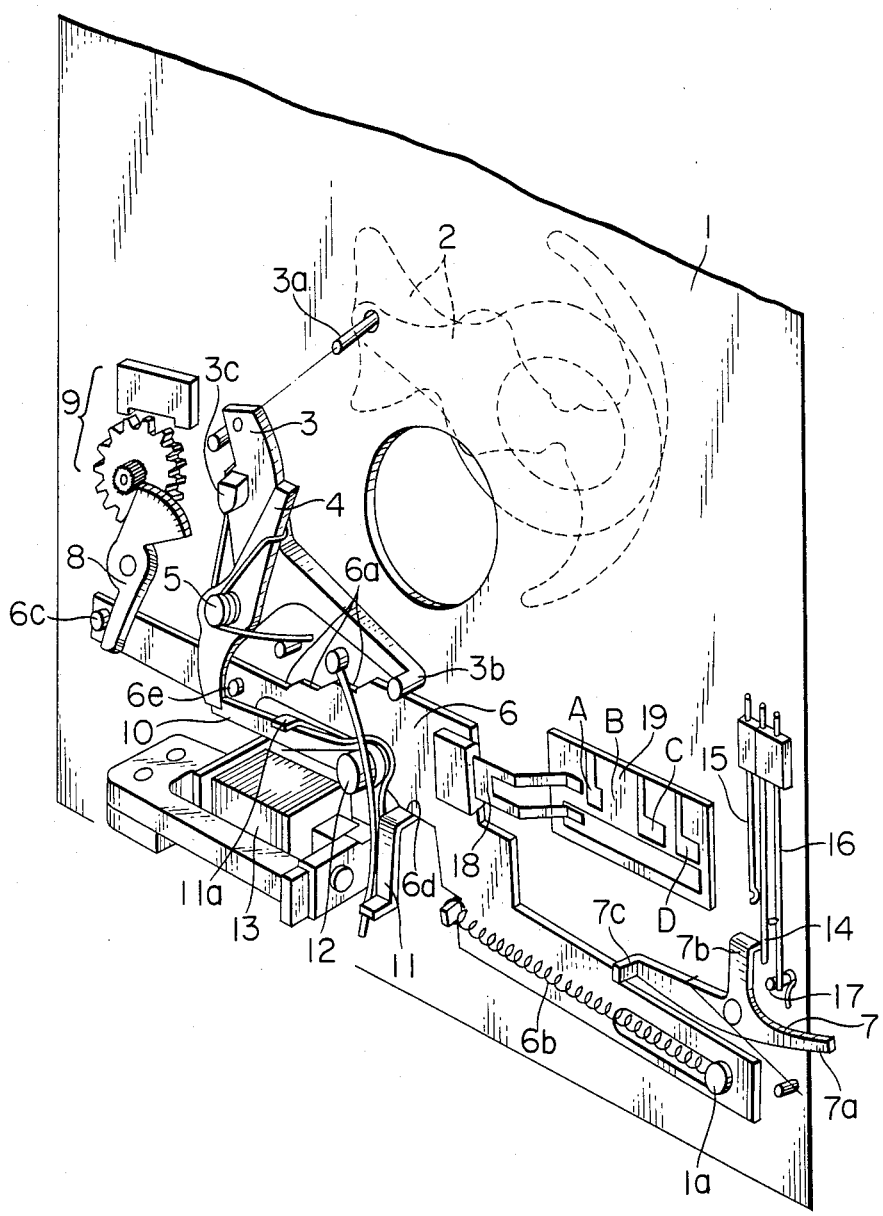
FIG. 1 is a perspective view illustrating an example of the controlling device of the invention.
Figure 2:
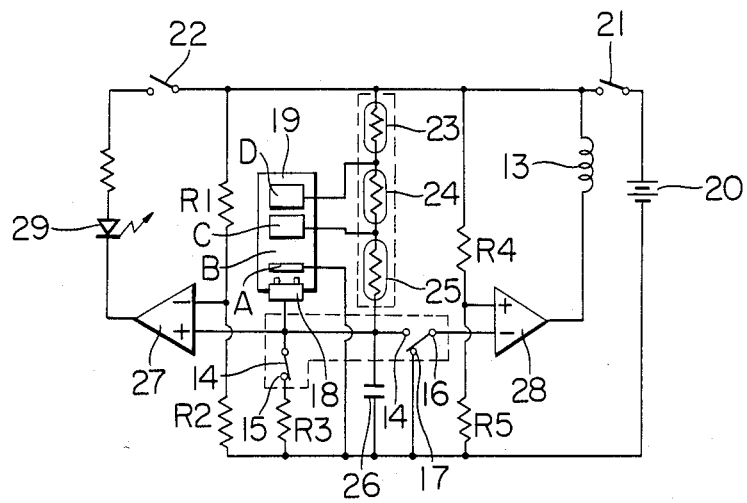
FIG. 2 is an electric circuit diagram thereof.
Figure 3:
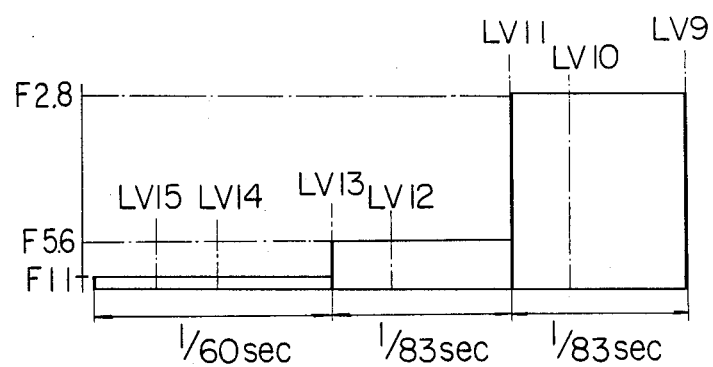
FIG. 3 is a graph exhibiting the relation between F-stops and shutter speeds.

FIG. 1 is a perspective view showing an example of the control device of the present invention, FIG. 2 is an electric circuit diagram and FIG. 3 is an aperture-shutter speed diagram.

In FIG. 1 and FIG. 2, 1 is a shutter chassis plate, 2 is a shutter blade-cum-iris and 3 is a blade-driving lever comprising a driving pin 3a for shutter blades 2, an iris-regulating part 3b and a driven part 3c for closing and 4 is a blade-closing lever, 5 is a center axle of gyration for a blade-driving lever 30 and for a blade-closing lever 4, 6 is a controlling lever having an iris-regulating cam part 6a, 7 is a holding lever for the controlling lever 6, 8 is a speed-regulating lever for the controlling lever 6, 9 is an escape device, 10 is a holding lever for the blade-closing lever 4, 11 is a solenoid lever, 12 is a center axle of gyration for the holding lever 10 and the solenoid lever 11, 13 is a solenoid, 14 is a switching piece operated by the holding lever 7, 15 is a contact blade of the circuit for low brightness warning, 16 is a contact blade of a solenoid circuit, 17 is a terminal for grounding, 18 is a sliding contact blade mounted on the controlling lever 6, 19 is a switching terminal board to switch the storing conditions for photometry information, 20 is a battery for power source, 21 is a main switch, 22 is a switch of the circuit for low brightness warning, 23–25 are the CdS photoelectric elements formed on the same base board, 26 is a capacitor for storing of photometry information, 27 and 28 are comparators and 29 is an LED for low brightness warning.

Both FIG. 1 and FIG. 2 show the charged situation before the releasing operation. When the main switch 21 is turned on, the standard voltage distributed by both resistances R1 and R2 is inputted on the "−" terminal of the comparator 27 and on the "+" terminal thereof, and the subject brightness voltage distributed by both the total resistance (R23+R24+R25) of CdS photoelectric elements 23–25 and the resistance R3 is inputted. Now, when the switch 22 of the low brightness warning circuit is turned on, the LED 29 is lit to indicate the low brightness of the subject if the brightness of the subject is insufficient and the total resistance (R23+R24+R25) is great and consequently the voltage of the subject brightness is lower than the standard voltage. The LED 20 will not be lit if the subject brightness is sufficient and the total resistance (R23+R24+R25) is small and consequently the voltage of subject brightness is higher than the standard voltage. The switch 22 is a normally-opened switch and is opened when the low brightness check is completed. Further, when the main switch 21 is turned on, it excites the solenoid 13 through the comparator 28 and thereby the solenoid lever 11 is attracted and held against the force in the counterclockwise direction caused by the spring thereof.

Now, when the brightness of the subject is sufficient the release button (not illustrated) is depressed. Thereby the holding lever 7 of the controlling lever 6 rotates clockwise against the force of the spring being pushed on the driven portion 7a. The switch operating portion 7b depresses the switching piece 14 and detaches it from the contact blade 15 of the circuit for low brightness and further contacts it to the contact blade 16 of the solenoid circuit which will be detached concurrently from the ground terminal 17. Further, the holding lever 7 is released from the holding of the controlling lever 6 before the switching piece 14 contacts the contact blade 16 of the solenoid circuit. Thereby, the controlling lever 6 starts moving to the right side being pulled by the spring 6b and immediately after the moving to the right side, the sliding contact blade 18 contacts the terminal portion A for grounding of the switching terminal board 19, whereby the capacitor 26 is discharged. Therefore, the contact of the switching piece 14 to the contact blade 16 of the solenoid circuit and the detaching of the contact blade 16 of the solenoid circuit from the terminal for grounding 17 are made during the period when the sliding contact blade 18 contacts the terminal portion A for grounding and the capacitor 26 is discharged. Incidentally, the traveling of the controlling lever 6 to the right side is regulated at a certain speed because the speed-controlling pin 6c provided thereof is engaged with the escape device 9 through the speed-regulating lever 8. The speed-regulating lever 8 rotates clockwise so that it constantly contacts the speed-controlling pin 6c.

With a further movement of the controlling lever 6 toward the right side, an aperture controlling portion 3b of the blade-driving lever 3 to which the force to rotate clockwise is given by the spring falls in the first step of the aperture controlling cam portion 6a of the controlling lever 6. The blade-driving lever 3 rotates clockwise accordingly and thereby the driving pin 3a opens shutter blades 2 to the aperture of F 11, for example. The timing of such opening and the timing for the sliding contact blade 18 to leave the terminal portion A for grounding on the switching terminal board 19 and to contact the insulated portion B are synchronized. Therefore, charging of the capacitor 26 through CdS photoelectric elements 23-25 is started again concurrently with the opening of the shutter blades 2 and when the charged voltage exceeds the standard voltage distributed by the resistances R4 and R5, the comparator 28 discontinues the excitation for the solenoid 13. The solenoid lever 11 attracted and held by the excitation of the solenoid 13, when the controlling lever 6 is in a position where it is held, is obstructed by the holding portion 6d of the controlling lever 6 and thereby it cannot rotate even if it is urged to rotate counterclockwise by the force of the spring with no excitation for the solenoid 13. However, when the controlling lever 6 moves toward the right side, the solenoid lever 11 released from the holding thereof due to the discontinuation of the excitation for the solenoid 13 is rotated counterclockwise by the spring force and the operation hook portion thereof 11a pushes the holding lever 10 of the blade-closing lever 4 to make it rotate counterclockwise against the spring force in the clockwise direction and thereby disengages it from the holding of the blade-closing lever 4. The blade-closing lever 4 released from its holding is rotated counterclockwise by the spring force and it pushes the driven portion 3c of the blade-driving lever 3 and causes the blade-driving lever 3 to rotate counterclockwise against its spring force and thereby closes the shutter blades 2.

With a further movement of the controlling lever 6 toward the right side, on the other hand, the following time periods are provided: the period from the moment the sliding contact blade 18 leaves the terminal portion A for grounding of the switching terminal board 19 up to the moment it contacts the first short-circuitting terminal portion C that short-circuits the CdS photoelectric element 25 through the insulating portion B; the period from the moment it contacts the first short-circuitting terminal portion C up to the moment it contacts the second short-circuitting terminal portion D that short-circuits CdS photoelectric elements 24 and 25; and the period during which it contacts the second short-circuitting terminal portion D. These are set to be 1/60 sec.; 1/83 sec. and 1/83 sec. respectively as shown in FIG. 3, for example, depending on the speed regulation of the controlling lever 6 and the arrangement of each terminal on the switching terminal board 19. It is so constituted that the length of the first step on the cam portion 6a provided on the controlling lever 6 that gives the aperture of F 11 corresponds to the length during which the sliding contact blade 18 leaves the terminal portion A for grounding and contacts the first short-circuitting terminal portion C and the length of the second step giving the aperture of F 5.6 corresponds to the length from the contact of the sliding contact blade 18 with the first short-circuitting terminal portion C to the contact thereof with the second short-circuitting terminal portion D and the third step gives the aperture of F 2.8. Corresponding to that, it is to established that when the brightness of the subject is equal to or higher than LV 13 under ASA 100 for example, the capacitor 26 is charged within 1/60 sec. through CdS photoelectric elements 23-25 at the voltage equal to or higher than the standard voltage of the comparator 28 and when the brightness of the subject is in the range from LV 11 to LV 13, the capacitor 26 is charged within (1/60+1/83) sec. through CdS photoelectric elements 23 and 24 passing the step through CdS photoelectric elements 23-25 at the voltage that is equal to or higher than the standard voltage and further with LV 11 or lower than that, the charging is made within (1/60+2/83) sec. through CdS photoelectric element 23 passing the steps through CdS photoelectric elements 23-25 and through CdS photoelectric elements 23 and 24 at the voltage not less than the standard voltage in the range of LV 9 or more where the low brigtness warning is not made. Therefore, with a limitation of the shutter time (1/60 sec. in the aforesaid example) that has less danger of causing blurring, it is possible to photograph laying stress on the iris effect (aperture F 11) when the subject is bright (LV 13 or more under ASA 100) and even when the subject is less bright (LV 11-13 or LV 9-11 under ASA 100). By the above, it is generally possible to photograph laying more stress on the iris effect than that for the conventional controlling device because the conditions for charging the capacitor 26 can be changed depending on the change of the aperture (F 5.6 or further to F 2.8). Moreover, even if the shutter time is long when the subject is dark, it cannot happen that more problems due to blurring occur than the conventional controlling method because the effect of the occurrence of problems due to blurring is less for the shutter speed (1/60 sec. or further 1/83 sec.) on the condition (F 11 or F 5.6) wherein the aperture is completely stopped down.

As is obvious from the above description, according to a control method and the device thereof of the invention, it is possible to photograph laying stress on an iris-effect, and a higher accuracy is not required for adjusting a focus than in the conventional control methods. This fact advantageously provides a camera by which the focus is automatically adjusted as in an auto-focus camera, so as to improve an automatic focussing device by its simplicity, lowered cost, and durability.

Now, at the point of time when sliding contact blade 18 comes in contact with the terminal of secondary short circuit terminal portion D of switching terminal board 19, controlling lever 6 is stopped in its movement to the right by gyration center axle 12 for both stopper lever 10 serving also as the guide for the controlling lever 6 and solenoid lever or by tension stopper pin 1a for a coiled spring energizing the controlling lever 6. By that moment, shutter blades 2 are opened and shut to complete a photographing action as described before.

Restoration of the original charged state may be completed in such a method, for example, in that controlling lever 6 is moved to the left with coupling to a film wind and the like and stopper lever 7 of the controlling lever 6 is coupled to the controlling lever 6 by the spring tension of the stopper lever 7. To be more concrete, when controlling lever 6 travels to the left up to the position shown in FIG. 1, speed-regulating lever 8 and escape device 9 are also returned to the positions shown in the figure, respectively because of their restoration behavior, and pin 6e for restoring controlling lever 6 makes blade-closing lever 4 rotate clockwise against the tensile strength of the spring of the blade-closing lever 4. Stopper section 6d of controlling lever 6 makes solenoid lever 11 rotate clockwise against the tensile strength of a spring. Thus, stopper lever 10 of blade-closing lever 4 is released freely from the pressure of solenoid lever 11 and is then rotated clockwise by the spring tensile strength, and then the same couples to blade-closing lever 4 so as to stop the lever 4 in motion when the lever 4 rotated up to the position shown in the figure. Sliding contact blade 18 travels to the left together with controlling lever 6 to return to the position shown in the figure, and when controlling lever 6 returns to the position shown in the figure and couples to stopper lever 7, switching piece 14 and contact blade 16 of the solenoid circuit will return to the original positions respectively, and thus every device will be restored completely into the original state.

It is to be understood that the invention is not limited to the specific embodiments as described above. For example, it is possible to use a photometric circuit such that the variations of a photometric information storage condition can be given by switching one resistor to another or one capacity of a capacitor to another thereof, or it is also possible to use a photoelectric element generating a photoelectromotive force in the invention. For another example, it becomes unnecessary to operate main switch 21 and low-brightness switch 22 separately from a releasing operation, provided that the main switch 21 is turned ON upon depression of the shutter release button and is kept turning ON until the main switch 21 is opened by the rotation of blade-closing lever 4 for closing the blade. The switch 22 of the circuit for warning of a low luminance serves as a normally closed switch by the rotation of stopper lever 7 for making the lever 7 free. In this example, it is further possible to omit the switch 22 of the circuit for warning of a low luminance therefrom.

What is claimed is:

1. A method for automatic exposure control wherein a shutter element is opened from a minimum aperture to a maximum aperture and is closed in response to a cutoff signal generated from an output signal of a photometry means by the detection of light from a subject, comprising the steps of providing a plurality of photosensitive elements for said photometry means which are selectively operated in stepwise fashion depending upon each aperture corresponding to the opening positions of the shutter element, and initiating an aperture closing operation during the shutter element opening operation in response to the cutoff signal.

2. A device for programmed automatic exposure control for a shutter element comprising:
    photometry means for detecting the brightness of a subject and providing an output signal in response thereto;
    driving means for opening the shutter element stepwise in a series of opening positions toward a full aperture,
    adjusting means for causing the output signal of the photometry means to vary in accordance with each aperture corresponding to the opening positions of the shutter element; and
    closing means for receiving the output signal of said photometry means and closing the shutter element.

3. The device described in claim 2 wherein the photometry means includes a plurality of photosensitive elements, and the adjusting means includes means for progressively short-circuiting photosensitive elements in accordance with each aperture corresponding to the opening positions of the shutter element.

* * * * *